United States Patent
Ho et al.

[11] Patent Number: 6,074,227
[45] Date of Patent: Jun. 13, 2000

[54] EJECTING MECHANISM AND A CONNECTOR USING THE SAME

[75] Inventors: Yu-Ming Ho, Pen-Chiao; Hung-Chi Yu, Taipei Hsien; Ming-Chung Lai, Shin-Juang, all of Taiwan

[73] Assignee: Hon Hai Precision Ind. Co., Ltd., Taipei Hsien, Taiwan

[21] Appl. No.: 09/121,246

[22] Filed: Jul. 23, 1998

[30] Foreign Application Priority Data

Oct. 9, 1997 [TW] Taiwan .................................. 86217345

[51] Int. Cl.$^7$ .................................................. H01R 13/62
[52] U.S. Cl. ........................... 439/159; 439/152; 439/160
[58] Field of Search .................................. 439/159, 160, 439/152; 361/798, 754

[56] References Cited

U.S. PATENT DOCUMENTS

| | | | |
|---|---|---|---|
| 2,565,492 | 8/1951 | French, Jr. ............................... | 439/160 |
| 5,026,296 | 6/1991 | Hasiguchi ................................ | 439/159 |
| 5,507,658 | 4/1996 | Ho ........................................... | 439/159 |
| 5,533,906 | 7/1996 | Abe ......................................... | 439/159 |
| 5,573,413 | 11/1996 | David et al. ............................. | 439/159 |
| 5,597,316 | 1/1997 | David et al. ............................. | 439/159 |
| 5,871,365 | 2/1999 | Kajiura .................................... | 439/159 |
| 5,890,920 | 4/1999 | David et al. ............................. | 439/159 |
| 5,899,763 | 5/1999 | Kajiura .................................... | 439/159 |

*Primary Examiner*—Gary F. Paumen
*Assistant Examiner*—Truc Nguyen

[57] ABSTRACT

An ejector mechanism for use in a card connector comprises a guiding arm defining a channel and a reception cavity in communication with the channel. A push bar is slidably received in the channel and in an intermediate portion thereof defines a slot and a cutout narrower than and communicating with the slot thus forming a first digit confronting and spaced from a second digit by the cutout. A spring device includes a first section firmly enclosing the first digit and a second section loosely enclosing the second digit and the spring device is retained in the reception cavity of the guiding arm. A lever device has a driving end connected to one retaining end of the push bar thus when the push bar slides in the channel of the guiding bar the lever device is driven by the push bar to force the card connector to eject a memory card. The spring device is compressed upon a push on the push bar for ejecting the memory card and the spring device reverts to force the push bar back to its original position upon release of the push.

2 Claims, 6 Drawing Sheets

EJECTING MECHANISM AND A CONNECTOR USING THE SAME

BACKGROUND OF THE INVENTION

1. Field of The Invention

The present invention relates to an ejecting mechanism for properly ejecting a memory card from a connector which utilizes the ejecting mechanism, and particularly to an ejecting mechanism which can prevent a spring thereof from being deformed in a lateral direction with respect to the axis thereof during ejection of the memory card.

2. The Prior Art

Memory cards have become popular due to the trend of the compact size, modularization, and object oriented requirement of the personal computer field, therefore card bus connectors following the PCMCIA standard for receiving memory cards have also become popular. A conventional card bus connector 9 including an ejector mechanism 90 is shown in FIGS. 4, 5 and 6. Specifically, the conventional ejector mechanism 90 comprises a guiding arm 91 defining a passage 912 therein for slidably receiving a push bar 92. The guiding bar 91 has a handle portion 920 at one end thereof for manual operation including an insertion as shown by an arrow "B" and a rejection opposite to the direction of the arrow "B", and a slit 925 defined at another end thereof for engaging with a lever mechanism 100 which is driven by the ejector mechanism 90 to eject a memory card (not shown) received in the connector 9. The guiding arm 91 also defines a reception cavity 911 between a first wall 913 and a second wall 914 which constitutes a portion of the passage 912 for receiving an intermediate portion of the push bar 92 and a spring 93 positioned around the intermediate portion. Specifically, the intermediate portion of the push bar 92 defines an elongate slot 921 in a center thereof and a cutout 922 communicating between the slot 921 and an exterior thereby forming a first digit 923 and a second digit 924 confronting and spaced from each other by the cutout 922. An exertion portion (not shown) defined in one distal end of an inner wall of the elongate slot 921 abuts against an end winding of the spring 93 when the spring 93 is retained around the digits 923, 924. The spring 93 positioned around the digits 923, 924 has a reciprocation movement following the sliding movement of the push bar 92 so as to eject the memory card (not shown). However, the spring 93 is apt to be deformed laterally thus causing malfunction during operation (see FIG. 6) since the force exerted on the spring 93 is not evenly applied on the first winding portion of the spring 93 due to an uneven contact between the push bar 92 and the spring 93.

Thus, it is requisite to provide a new ejector mechanism which can prevent the spring thereof from being deformed laterally.

SUMMARY OF THE INVENTION

The primary purpose of the present invention is to provide a new ejector mechanism for use with a card connector which can ensure the proper function of a spring thereof by preventing lateral deformation of the spring when it is driven by a push bar of the ejector mechanism.

In accordance with one aspect of the present invention, an ejector mechanism for use in a card connector comprises a guiding arm defining a channel and a reception cavity in communication with the channel. A push bar is slidably received in the channel and in an intermediate portion thereof defines a slot and a cutout narrower than and communicating with the slot thus forming a first digit confronting and spaced from a second digit by the cutout. A spring device includes a first section firmly enclosing the first digit and a second section loosely enclosing the second digit and the spring device is retained in the reception cavity of the guiding arm. A lever device has a driving end connected to one retaining end of the push bar thus when the push bar slides in the channel of the guiding bar the lever device is driven by the push bar to force the card connector to eject a memory card. The spring device is compressed upon a push on the push bar for ejecting the memory card and the spring device reverts to force the push bar back to its original position upon release of the push.

In accordance with another aspect of the present invention a card connector comprises a housing having a plurality of contacts extending therefrom and engaging with a U-shaped frame on which a lever device is pivotably mounted. The lever device has a driving portion and a follower portion pivotably connected to and driven by the driving portion. A first guiding arm and a second guiding arm are connected to two sides of the U-shaped frame and each guiding arm defines an inner channel cooperating to guide an external memory card to slide therethrough, wherein the first guiding arm defines an outer channel opposite the inner channel thereof and a reception cavity in communication with the outer channel. A push bar is slidably received in the outer channel of the first guiding arm and in an intermediate portion thereof defines a slot and a cutout narrower than and communicating with the slot thus forming a first digit confronting and spaced from a second digit by the cutout. A spring device includes a first section firmly enclosing the first digit and a second section loosely enclosing the second digit and the spring device is retained in the reception cavity of the first guiding arm. The driving portion of the lever device has a driving end connected to one retaining end of the push bar thus when the push bar slides in the outer channel of the first guiding bar the driving portion of the lever device is driven by the push bar to pivotably drive the follower portion to eject the memory card. The spring device is compressed upon a push on the push bar for ejecting the memory card and the spring device reverts to force the push bar back to an unpushed position upon release of the push.

These and additional objects, features and advantages of the present invention will become apparent after reading the following detailed description of the preferred embodiment of the invention taken in conjunction with the appended drawing figures.

DETAILED DESCRIPTION OF THE PREFERRED EMBODIMENTS

Figure 1:
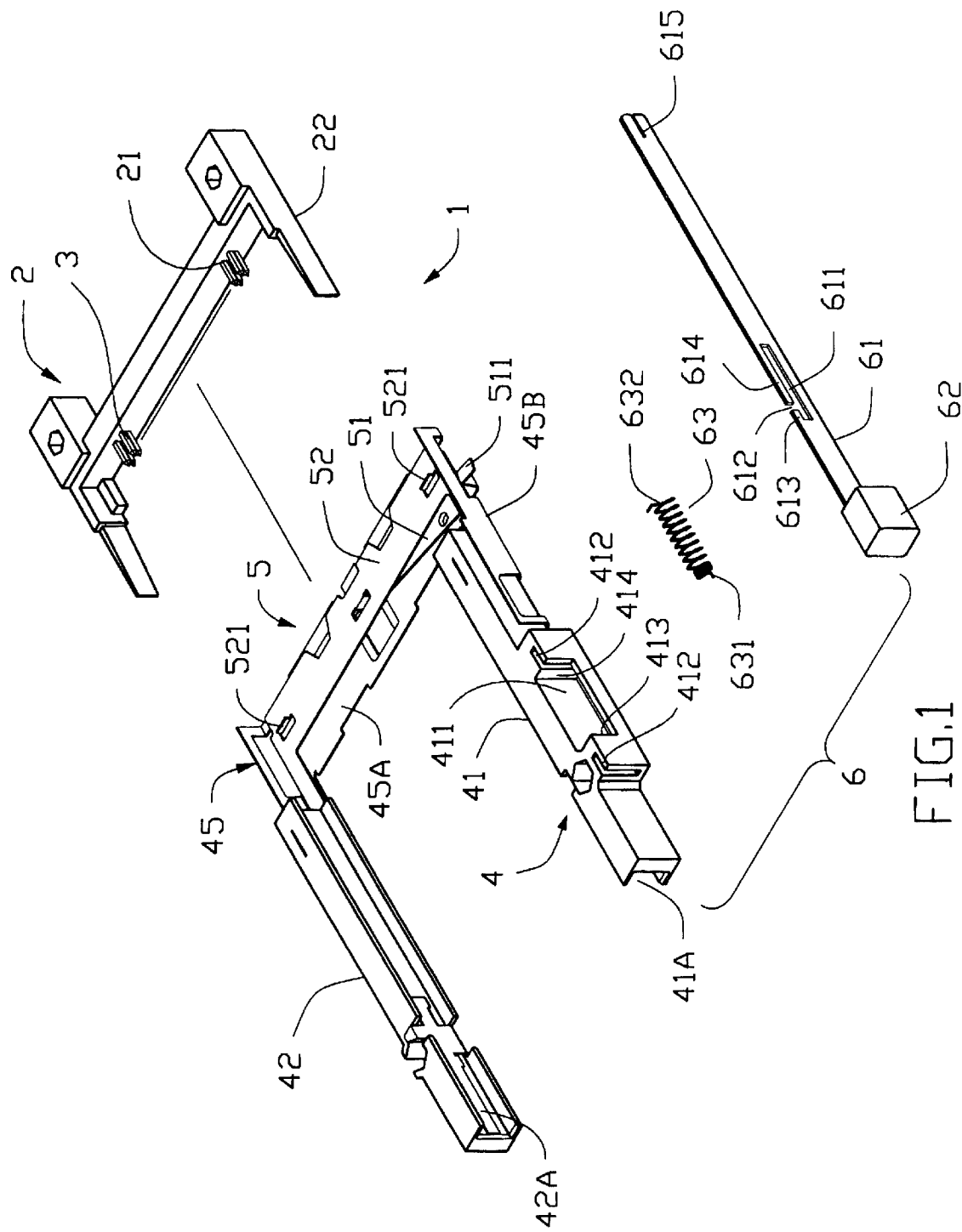
FIG. 1 is an exploded view of a card bus connector in accordance with the present invention.
Figure 2:
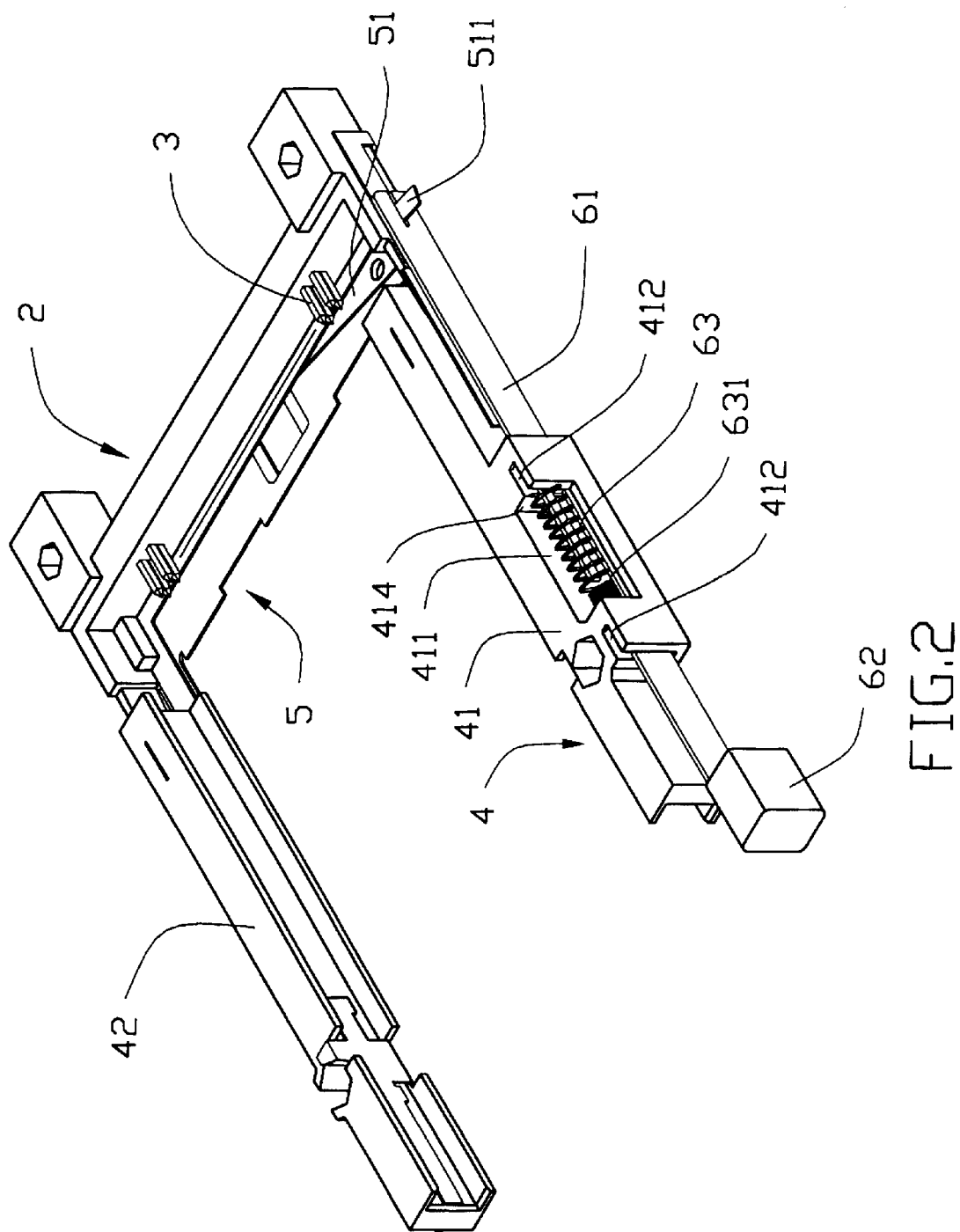
FIG. 2 is an assembled view of FIG. 1.

Referring to FIGS. 1 and 2, a card bus connector 1 in accordance with the present invention comprises an insulative housing 2 defining a plurality of passageways 21 from which a corresponding number of contacts 3 extend, a frame 4 having a U-shaped plate 45 comprising an intermediate portion 45A from which two side portions 45B extend and first and second guiding arms 41, 42 connected to opposite side portions 45B of the U-shaped plate 45. The first and second guiding arms 41, 42 each define an inner channel 41A, 42A cooperating to slidably receive an external memory card (not shown) which is electrically connected to the contacts 3 of the housing 2. A lever device 5 comprises a driving plate 51 and a follower plate 52 pivotably connected to the driving plate 51 which is pivotably mounted on the intermediate portion 45A of the U-shaped plate 45. The follower plate 52 comprises two tabs 521 projecting upward therefrom for abutting against the memory card (not shown) when the latter is inserted into the connector 1. The driving plate 51 has one driving end 511 laterally extending through and movable under one side of the U-shaped plate 45. Two engaging bars 22 extend from two distal ends of the housing 2 for engaging with the U-shaped plate 45 of the frame 4.

An ejector mechanism 6 comprises a push bar 61, the first guiding arm 41 which defines an outer channel 412 opposite the inner channel 41A for slidably receiving the push bar 61, and a spring 63 positioned around an intermediate portion of the push bar 61. The push bar 61 has a handle portion 62 at one end thereof for manual operation and a slit 615 defined at another end thereof for engaging with the driving end 511 of the lever device 5. The guiding arm 41 defines a reception cavity 411 between a first wall 413 and a second wall 414 which constitutes a portion of the outer channel 412 for receiving the intermediate portion of the push bar 61 and the spring 63 binding around the intermediate portion. Specifically, the intermediate portion of the push bar 61 defines an elongate slot 611 in a center thereof and a cutout 612 narrower than and communicating with the slot 611 thereby forming a first digit 613 and a second digit 614 confronting and spaced from each other by the cutout 612. The spring 63 has a first section 631 and second section 632 wherein the first section 631 is adapted to firmly enclose the first digit 613 and the second section 632 is adapted to loosely enclose the second digit 614.

Figure 3:
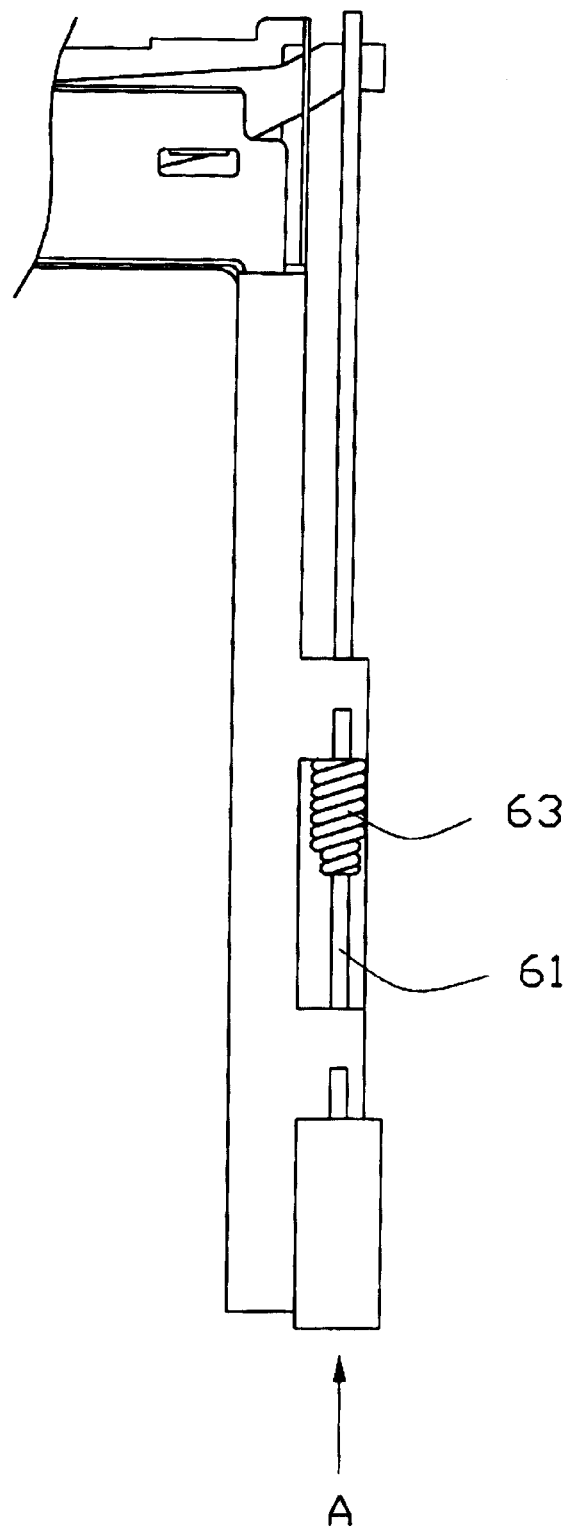
FIG. 3 is an elevational view showing a compressed status of a spring of the connector of FIG. 1.
Figure 4:
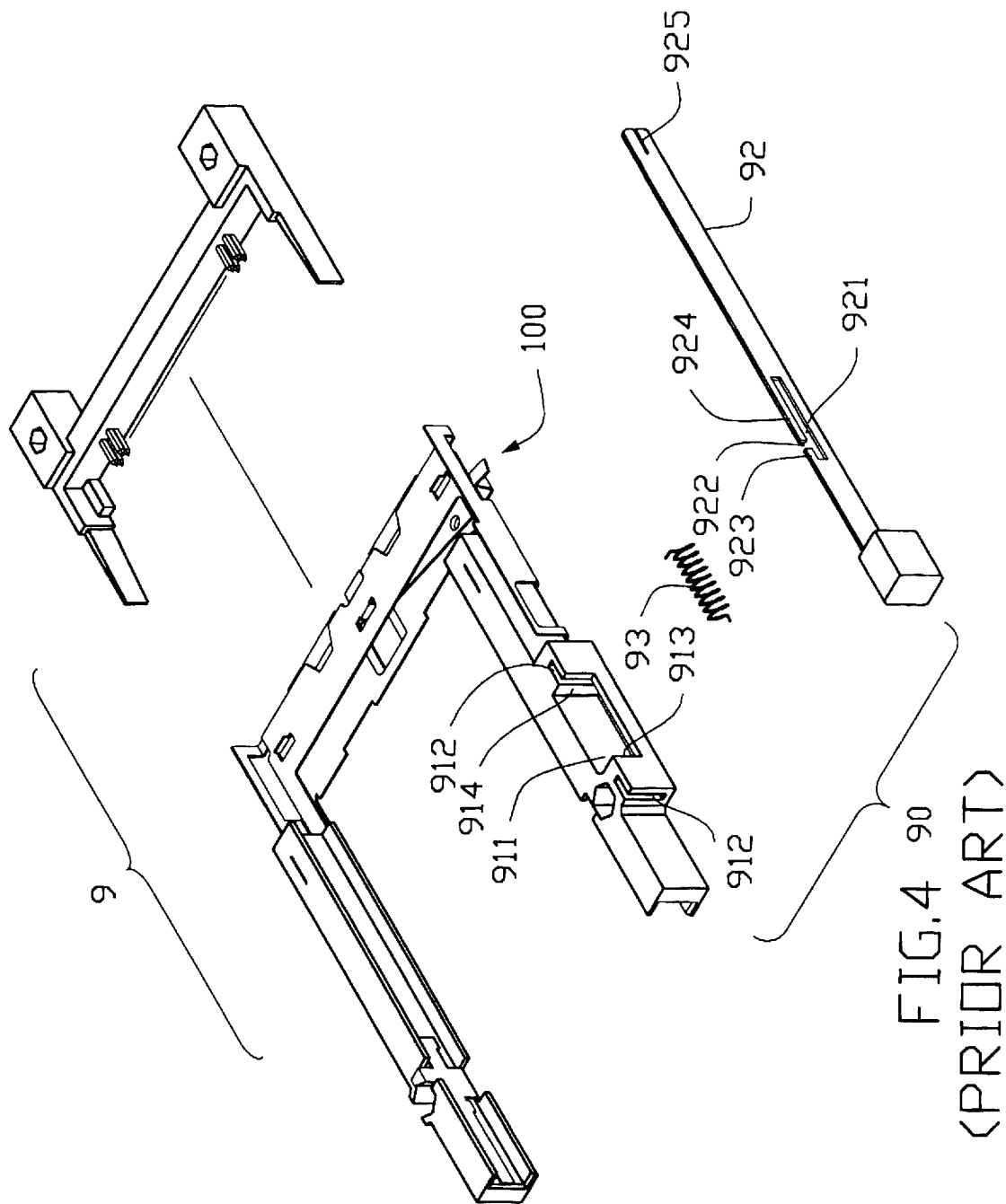
FIG. 4 is an exploded view of a conventional card bus connector.
Figure 5:
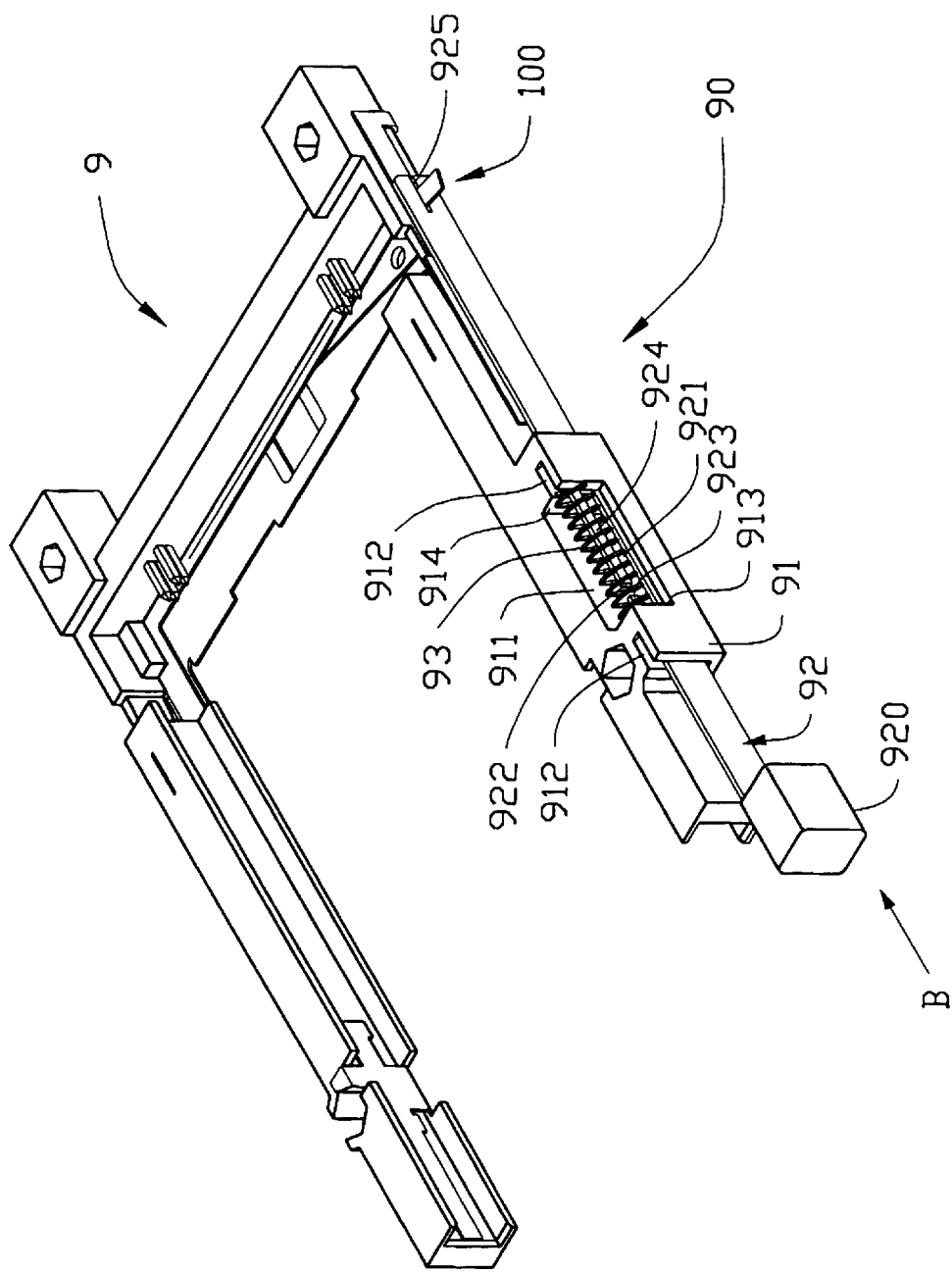
FIG. 5 is an assembled view of FIG. 4.
Figure 6:
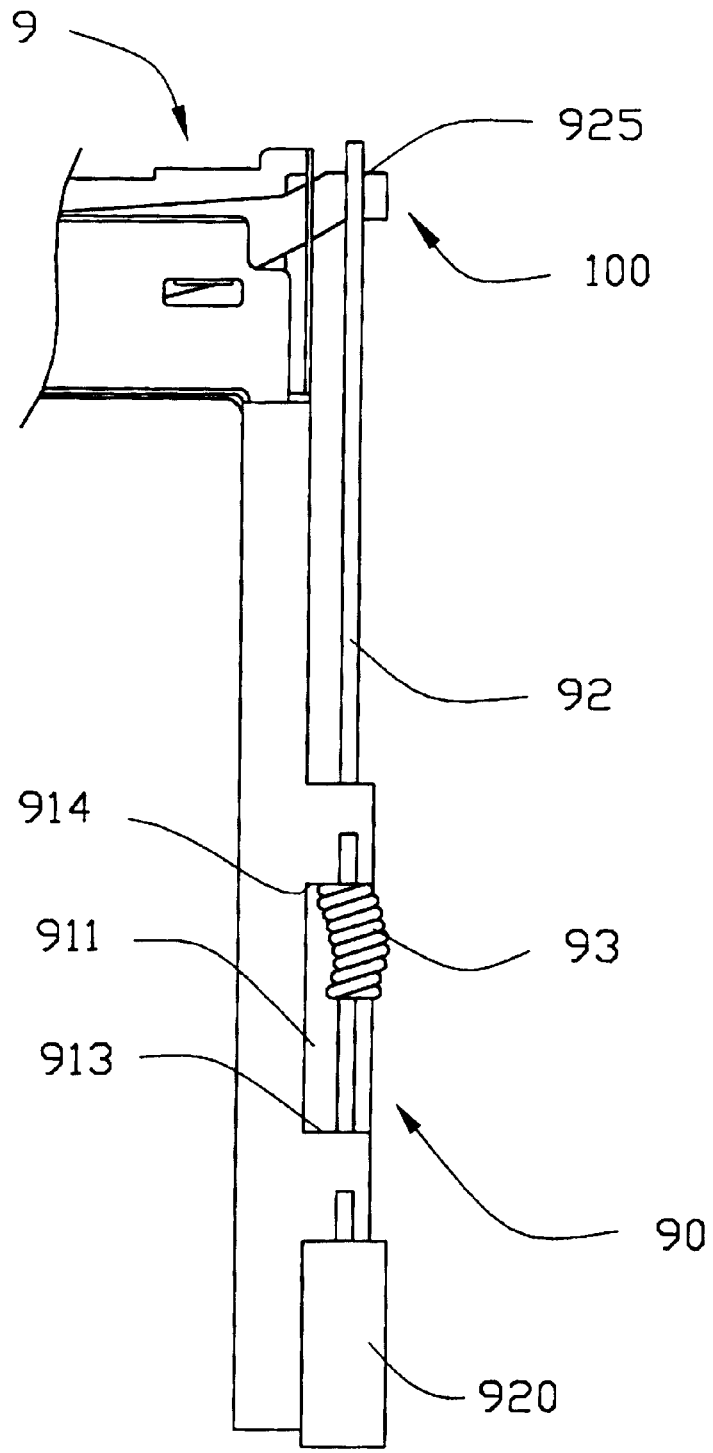
FIG. 6 is an elevational view showing a laterally deformed spring thereof.

Also referring to FIG. 3, when the push bar 61 is pushed from a direction into the housing 2 as shown by arrow "A" to slide in the outer channel 412, the spring 63 is compressed and the driving plate 51 of the lever device 5 is driven by the push bar 61 to pivotably drive the follower plate 52 to eject the memory card by the tabs 521 thereof.

When compressed, the first section 631 of the spring 63 remains uncompressed since it is integrated with the first digit 613 of the push bar 61 while the second section 632 is compressed uniformly in the lengthwise direction of the push bar 61 due to a reaction force from the second wall 414 of the cavity 411. When compressed, the spring 63 is not deformed laterally because the first section 631 thereof is stuck around the first digit 613 of the push bar 61 and exerts a uniform force on the windings of the second section 632. The push bar 61 reverts to its unpushed position after releasing the depression due to a recovery force from the spring 63.

While the present invention has been described with reference to a specific embodiment, the description is illustrative of the invention and is not to be construed as limiting the invention.

Therefore, various modifications to the present invention can be made to the preferred embodiment by those skilled in the art without departing from the spirit and scope of the invention as defined by the appended claims.

What is claimed is:

1. An ejector mechanism for use in a card connector comprising:

a guiding arm defining a channel and a reception cavity in communication with the channel;

a push bar slidably received in the channel and in an intermediate portion thereof defining a slot and a cutout narrower than and communicating with the slot thus forming a first digit confronting and spaced from a second digit by the cutout;

a spring having a first section firmly enclosing the first digit and a second section loosely enclosing the second digit and the spring being retained in the reception cavity of the guiding arm; and a lever device having a driving end connected to a slit in one end of the push bar thus when the push bar slides in the channel of the guiding arm the lever device is driven by the push arm to eject a memory card out of the card connector;

whereby the spring is compressed upon a push on the push bar for ejecting the memory card and the spring reverts to force the push bar back to its original position upon release of the push.

2. A card connector comprising:

a housing having a plurality of contacts extending therefrom and engaging with a U-shaped plate on which a lever device is pivotably mounted and comprises a driving plate and a follower plate pivotably connected to and driven by the driving plate;

a first guiding arm and a second guiding arm connected to two sides of the U-shaped plate and each guiding arm defining an inner channel cooperating to guide an external memory card to slide therethrough, wherein the first guiding arm defines an outer channel opposite the inner channel thereof and a reception cavity in communication with the outer channel;

a push bar slidably received in the outer channel of the first guiding arm and in an intermediate portion thereof defining a slot and cutout narrower than and communicating with the slot thus forming a first digit confronting and spaced from a second digit by the cutout;

a spring having a first section firmly enclosing the first digit and a second section loosely enclosing the second digit and the spring being retained in the reception cavity of the first guiding arm; and the driving plate of the lever device having a driving end connected to a slit in an one end of the push bar thus when the push bar slides in the outer channel of the first guiding arm the driving plate of the lever device is driven by the push bar to pivotably drive the follower plate to eject the memory card;

whereby the spring is compressed upon a push on the push bar for ejecting the inserted memory card and the spring reverts to force the push bar back to an unpushed position upon release of the push.

* * * * *